(12) United States Patent
Martin

(10) Patent No.: US 11,422,183 B2
(45) Date of Patent: Aug. 23, 2022

(54) METHOD FOR DETECTING AT LEAST ONE GLITCH IN AN ELECTRICAL SIGNAL AND DEVICE FOR IMPLEMENTING THIS METHOD

(71) Applicant: NAGRAVISION S.A., Cheseaux-sur-Lausanne (CH)

(72) Inventor: Jean-Marie Martin, Cheseaux-sur-Lausanne (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 349 days.

(21) Appl. No.: 16/620,300

(22) PCT Filed: Jun. 12, 2018

(86) PCT No.: PCT/EP2018/065445
§ 371 (c)(1),
(2) Date: Dec. 6, 2019

(87) PCT Pub. No.: WO2018/229029
PCT Pub. Date: Dec. 20, 2018

(65) Prior Publication Data
US 2020/0209309 A1 Jul. 2, 2020

(30) Foreign Application Priority Data
Jun. 15, 2017 (EP) .................................. 17290078

(51) Int. Cl.
*G01R 31/317* (2006.01)
*G06F 1/08* (2006.01)
(Continued)

(52) U.S. Cl.
CPC . *G01R 31/31703* (2013.01); *G01R 31/31719* (2013.01); *G06F 1/08* (2013.01); *G06F 21/72* (2013.01); *G06F 21/75* (2013.01)

(58) Field of Classification Search
None
See application file for complete search history.

(56) References Cited

U.S. PATENT DOCUMENTS 10,891,402 B2 * 1/2021 Martin .................... G06F 21/87
11,041,927 B1 * 6/2021 Wheaton ............ G01R 33/5608
(Continued)

FOREIGN PATENT DOCUMENTS

JP H0634665 A * 2/1994 ............... G01R 3/28

OTHER PUBLICATIONS

Gomina et al., "Power supply glitch attacks: design and evaluation of detection circuits," 2014 IEEE International Symposium on Hardware-Oriented Security and Trust (HOST), May 5, 2014, pp. 136-141, XP 032620090.
(Continued)

*Primary Examiner* — Jermele M Hollington
(74) *Attorney, Agent, or Firm* — Oblon, McClelland, Maier & Neustadt, L.L.P.

(57) ABSTRACT

A method for detecting at least one glitch in an electrical signal. This method comprises: generating, from said electrical signal, at least one digital oscillating signal which is sensitive to glitches; and—performing the following steps as a repeatable round: (a) assigning a time window to at least one digital oscillating signal; said time window being implemented on the basis of a clock signal substantially insensitive to said at least one glitch to be detected; (b) determining from said time window a sampling value of the digital oscillating signal, said sampling value being characteristic of said digital oscillating signal throughout its time window; (c) detecting any potential glitch in said electrical signal by comparing said sampling value with an expected reference
(Continued)

value; and (d) outputting a response typifying a result of the comparison step. Also, a device for implementing said method is described.

14 Claims, 4 Drawing Sheets

(51) Int. Cl.
*G06F 21/72* (2013.01)
*G06F 21/75* (2013.01)

(56) References Cited

U.S. PATENT DOCUMENTS

| | | | |
|---|---|---|---|
| 2007/0075746 A1 | 4/2007 | Fruhauf et al. | |
| 2010/0127767 A1 | 5/2010 | Kim et al. | |
| 2015/0066438 A1* | 3/2015 | Brooks | G01R 19/0092 702/191 |
| 2015/0369865 A1 | 12/2015 | Hershman et al. | |
| 2017/0032125 A1* | 2/2017 | Lee | G06F 21/77 |
| 2019/0318136 A1* | 10/2019 | Martin | H01L 23/576 |
| 2021/0396789 A1* | 12/2021 | Lentz | G01R 19/16538 |

OTHER PUBLICATIONS

Goikoetxea Yanci et al., "Characterization of a Voltage Glitch Attack Detector for Secure Devices," 2009 Symposium on Bio-inspired Learning and Intelligent Systems for Security, IEEE, Aug. 20, 2009, pp. 91-96, XP 031593586.

Beringuier-Boher et al., "Voltage Glitch Attacks on Mixed-Signal Systems," 2014 17$^{th}$ Euromicro Conference on Digital System Design, IEEE, Aug. 27, 2014, pp. 379-386, XP 032665127.

International Search Report dated Jul. 27, 2018 in PCT/EP2018/065445 filed on Jun. 12, 2018.

European Search Report dated Nov. 24, 2017 in European Application 17290078.9 filed on Jun. 15, 2017.

* cited by examiner

METHOD FOR DETECTING AT LEAST ONE GLITCH IN AN ELECTRICAL SIGNAL AND DEVICE FOR IMPLEMENTING THIS METHOD

INTRODUCTION

The present disclosure relates to the field of electronic circuits, in particular integrated circuits where there is an interest to check that the supply voltage or the input signal of a circuit is constant, especially that it is not affected by any glitch.

BACKGROUND

Integrated circuits are powered by a DC power input signal having a nominal voltage defined with respect to ground reference. The digital components of integrated circuits are especially sensitive to any disturbance within their input signal.

A glitch can be regarded as a signal perturbation of a relative short duration which may unexpectedly occur and generally has an unknown origin. It typically refers to a very short self-recovery transient phenomenon. Glitches can result from a very poor quality power supply or noise on the power supply signal or power environment causing undue voltage spikes. More seriously, glitches can also be caused by hacker attacks. Indeed, malicious persons may seek to voluntarily generate disturbances in the power input signal of the circuit in order to cause internal malfunctions in the circuit. By changing the normal behaviour of the circuit, hackers can extract information that can be used to reverse some sensitive data or functions hidden within the circuit. Such sensitive data may refer to cryptographic keys used in encryption/decryption algorithms within smart cards, for instance.

To prevent such attacks, some circuits use specific security hardware solutions to check the integrity of their power supply. One of the solutions is based on the detection of glitches on the internal power supply of the circuit. Known glitch detectors use analog components. They are at least partially dependent on an analog technology and are sometimes very tricky to implement. Accordingly, such detectors typically require 1 to 2 months of development involving a cost range generally comprised between 30,000 to 60,000 US dollars. In addition, such glitch detectors require significant space within the circuit where they are implemented. They also need a certain energy consumption causing heat releases which reduce the energy efficiency of the circuit.

Accordingly, there is an interest in providing a solution suitable to detect at least one glitch in an electrical signal, while at least partially overcoming the drawbacks associated with common glitch detectors.

SUMMARY OF THE PRESENT SOLUTION

To address this concern, the present disclosure proposes a solution that allows glitch detection in an electrical signal, such as a power supply signal of a circuit or any electrical signal arising from such a power supply. This solution may be used either instead of or in addition to glitch detectors known from the prior art. Accordingly, it may be used to prevent glitch attacks, but it may also be used to monitor glitches on an electrical signal, e.g. on a power supply signal, of a circuit without any security considerations.

To this end, the present solution firstly proposes a method for detecting at least one glitch in an electrical signal. This method comprises:
  generating, from the electrical signal, at least one digital oscillatory signal which is sensitive to common glitches; and
  performing the following steps as a repeatable round:
    assigning a time window to at least one digital oscillatory signal, said time window being implemented on the basis of a clock signal which is substantially insensitive to said at least one glitch to be detected;
    determining from said time window a sampling value of the digital oscillatory signal, said sampling value characterizing said digital oscillatory signal throughout its time window;
    detecting any potential glitch in said electrical signal by comparing said sampling value with an expected reference value; and
    outputting a response typifying a result of the comparison step.

According to one embodiment, all the data or signals generated by the present solution are digital and are advantageously generated by digital components.

The clock signal is a reference signal that is typically used by an entire system. For this reason, the clock signal is usually not generated by a device such as a glitch detector dedicated to a specific function, but it typically refers to an input signal received by such device through a communication interface. In this case, the clock signal should not be considered as being "generated" by the present solution, but it should rather be regarded as an input signal which is imported from a third party device or entity.

However, even if the clock signal was generated within the present solution, it could be generated by a local source using digital components such as digital oscillator(s). Such a variant should be considered as another embodiment of the present solution.

Whatever the embodiment, the clock signal can remain insensitive to the glitch to be detected in the aforementioned electric signal. Indeed, in the case where the clock signal is an input signal provided by a third party clock generator, it is usually provided by an analog component or an analog set of components such as a quartz piezo-electric oscillator. Nevertheless, simpler analog tank circuits and even RC circuits may also be used. In all cases, these clock generators comprise analog components such as quartz, inductor, capacitor, which are almost insensitive to glitches according to what it has been observed through laboratory tests. Generally speaking, one can note that analog clock generators have insignificant sensitivity to glitches, unlike digital components which are rather very sensitive to such glitches. For these reasons, it could be also considered, in accordance to another embodiment, that the clock signal is locally generated within the present solution by an analog generator.

However, even if the clock signal is generated within the present solution using a local digital clock generator, the clock signal can remain insensitive to the glitch to be detected. Indeed, in such a case the local clock generator would be powered by an independent power source, namely by an electrical power source which is dissociated from that which supplies the electrical signal likely to be disturbed by glitches.

Thus, whatever the embodiment suggested above, it can be seen that significant advantages arise from the present solution, at least in terms of size, power consumption, development and cost price, due to the fact that the present solution uses digital components instead of analog components. Such digital components may refer to Complementary Metal Oxide Semiconductor (CMOS) standard cells for example. CMOS technology has the benefit of requiring extremely low power consumption. Accordingly, the present solution has a significant interest, e.g. for smart cards where the space to implement tamper resistant solutions, or to improve such solutions, is especially limited.

Other embodiments allow to further optimize the solution suggested so far, as described in the detailed description that will follow.

It should also be noted that the present solution is not limited to a method, but also refers to a device for implementing the method according to any of its embodiments. Other advantages and embodiments will also be disclosed in the detailed description.

BRIEF DESCRIPTION OF THE DRAWING

The solution and the embodiments suggested in the present disclosure should be taken as non-limitative examples and will be better understood with reference to the attached figures in which.

DETAILED DESCRIPTION

The following description refers both to a method and to a device. Although these two subject-matters are presented one after the other, it should be understood that any features disclosed in connection with the method may be applied, if any, to the device for implementing this method and vice-versa.

Glitch Examples and Glitch Impacts

Figure 1:
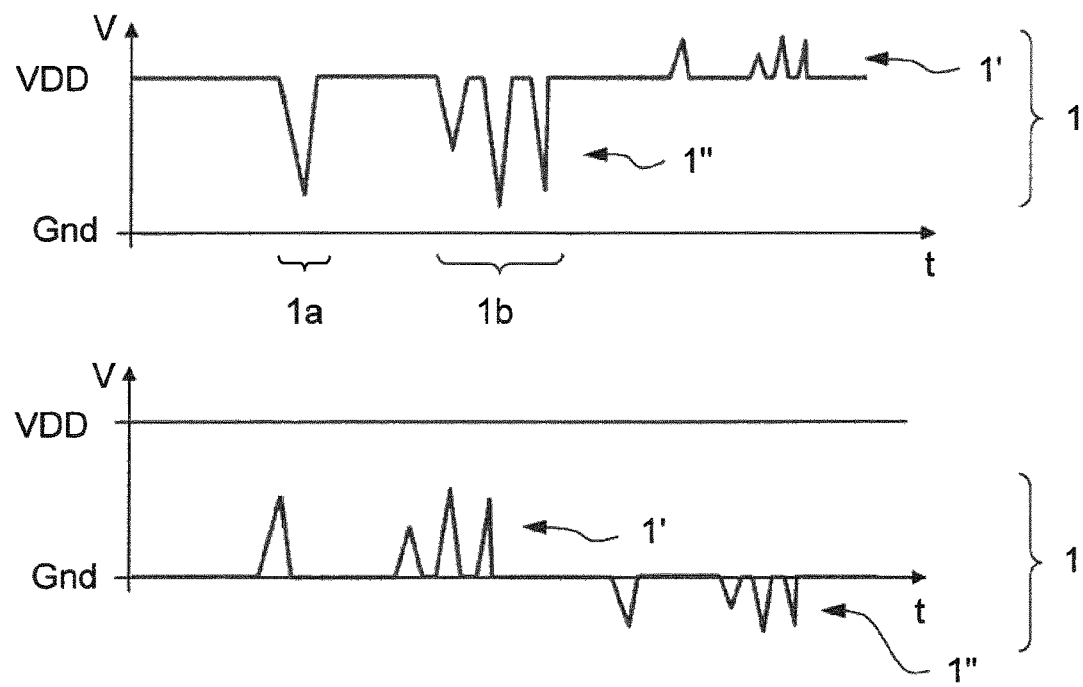
FIG. 1 schematically depicts different types of glitches usually known in glitch attacks.

FIG. 1 shows some examples of different kinds of glitches 1 which may be used by hackers in so-called glitch attacks. Glitches 1 can occur e.g. on the power supply (VDD) of an integrated circuit powered by a DC power supply, as shown in the upper graph of FIG. 1, or on the ground (GND), as shown in the lower graph of this Figure. Glitches 1 can refer to single spikes 1a, or can occur in a series of successive spikes 1b which do not necessarily have the same amplitude. As shown in FIG. 1, glitches 1 can be positive 1' or negative 1".

Glitches 1 should not be confused with noise that may occur in an electrical signal. Small variations, e.g. ±10% of the nominal value or voltage, of the electrical signal should be considered as noise due to the insignificant impact that such small variations may have on the logic circuit. Beyond the admitted range assigned to noise, the variations may be considered as glitches or common glitches. Similarly, glitches may have a minimum width in order to have a sufficient impact through the electrical signal. This minimum width can be considered, for example, as being of the order of 2-3 ns.

The effects of glitches on a power supply of a logic circuit may be different depending on the type of the elements of the logic circuit. In this regard, a distinction should be made between sequential logic and combinational logic. In combinational logic, the state of the output(s) at a given moment depends only on the circuit and on the value of the inputs at that instant. In contrast, in sequential logic the state of the output(s) of the circuit at the given instant depends on the value of the inputs at that instant and the value of the output(s) at the previous instants. In other words, the sequential logic uses the notion of storage memory, whereas the combinational logic does not have such a notion. Such a notion is obtained in the sequential logic by flip-flops, whereas the basic element of the combinational logic is the logic gate, e.g. AND, OR, XOR or NOT gates.

In addition, there are two main categories of flip-flops: some are asynchronous with respect to the clock signal and are called latches, whereas the others are synchronous with respect to the clock signal and are simply called flip-flops. Today, nearly all sequential logics are clocked or synchronous logics. This is the reason why the present description will specifically refer to synchronous circuits, namely circuits whose elements change their state in synchronism with the clock signal under normal conditions.

It has been assessed that glitches have a limited effect on sequential elements, especially on synchronous sequential elements because flip-flops can only be affected in the vicinity of a clock edge event. Since this sensitive instant corresponds to a rising or falling edge of the clock signal, it is very limited in time, contrary to the period of the clock signal.

In contrast, the glitches have much more impact on synchronous combinational elements, e.g. logic gates, since they can change the result of Boolean operation due to the variation of the delay cells. The effects of a glitch occurring on the power supply of combinational elements are quite complex. Nevertheless, they can be summarized as follows:

When a positive glitch 1' occurs on the power supply VDD or when a negative glitch 1" occurs on the ground GND, the delay of the logic element supplied in this way is accelerated.

When a negative glitch 1" occurs on the power supply VDD or when a positive glitch 1' occurs on the ground GND, the delay of the logic element supplied in this way is slow down.

Figure 2:
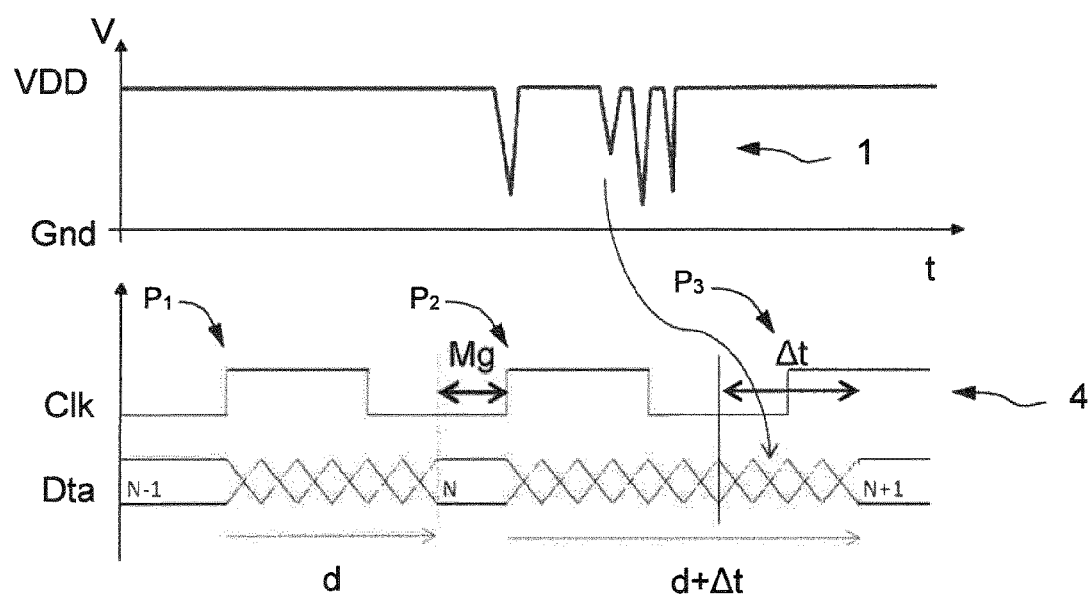
FIG. 2 illustrates an example of a glitch effect on a synchronous logic circuit.

By way of example, FIG. 2 shows the impact of glitches 1 on a synchronous design. The upper part of FIG. 2 shows a single glitch 1a and a series of glitches 1b occurring on the power supply of a synchronous circuit comprising flip-flops. In correspondence with this upper part, the lower part of FIG. 2 shows the clock signal 2 Clk and the data path Dta along the time axis t of the upper part. Boolean results N−1, N and N+1 are successively provided at the output of successive flip-flops. The operations to calculate the Boolean result N start at a first clock pulse $P_1$ and ends at the end of a normal delay d.

One can see that when the second clock pulse $P_2$ is rising, the Boolean result N is done and stable. This is shown through the safe margin Mg setup between the Boolean result N and the second clock pulse $P_2$. However, once the glitches 1a, 1b occur, they slow down the combinational logic between the two successive flip-flops as shown by the abnormally longer delay d+Et required for providing the Boolean result N+1. Consequently, when the third clock pulse P₃ is rising for capturing the Boolean result in accordance with a synchronous design, the result is captured before its operation ends properly. It generates a timing violation which may create a malfunction of the circuit or a local metastability inside the circuit. Metastability can be regarded as the ability, for a digital electronics circuit, to persist for an unknown duration in an unstable equilibrium due to the fact that it remains unable to decide what to do with its input signals.

Basic Concept of the Present Solution

Figure 3:
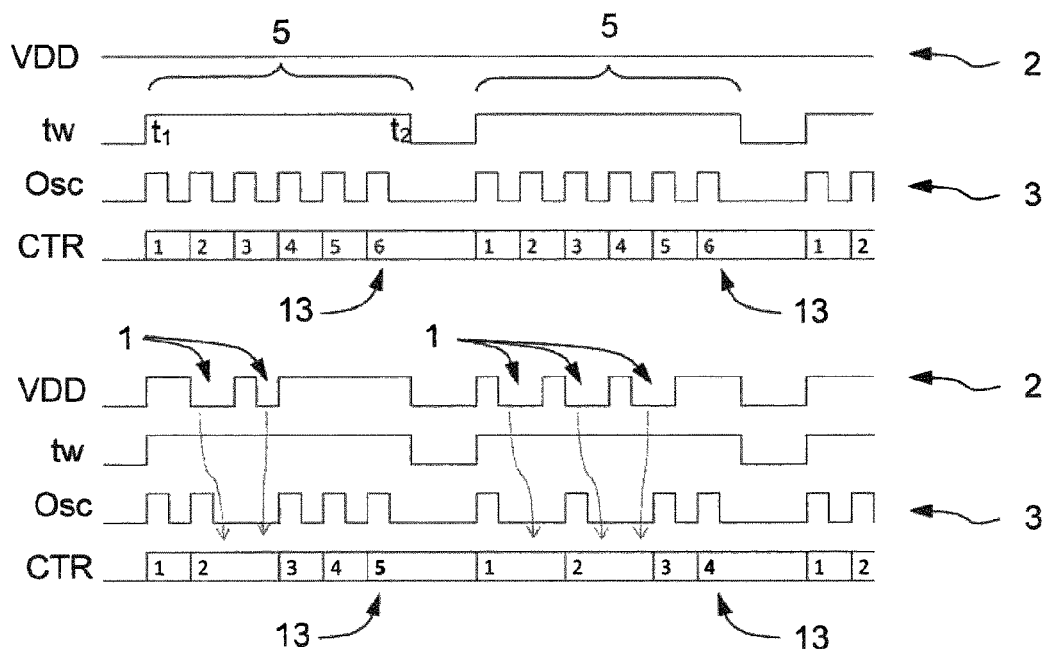
FIG. 3 schematically illustrates the basic concept of the present solution.

FIG. 3 schematically illustrates the basic concept used by the present solution to detect at least one glitch 1 in an electrical signal 2. The upper part of FIG. 3 illustrates a first instance where no glitch is present in the electric signal 2. In contrast, the lower part of FIG. 3 corresponds to a second instance where several glitches are present in the electrical signal 2. In this Figure, glitches are schematically represented by variations of square shapes according to a digital glitch model.

Glitches 1 can occur at any time, in any manner and can therefore be regarded as fully asynchronous in synchronous designs. From the aforementioned electric signal 2, where glitches 1 may occur as shown in FIG. 3, the present solution proposes to generate at least one digital oscillating signal 3 which is sensitive to common glitches 1. To this end, at least one digital oscillator, especially a ring oscillator, may be used as digital generator for generating the digital oscillating signal 3. The role of the digital oscillator(s) is to make possible the detection of any glitches, including those occurring between the rising and falling edges of a clock signal 4 (FIG. 2). Accordingly, the solution proposes the use of asynchronous logic to detect glitches within a circuit designed for synchronous logic.

The basic concept is to use at least one free running digital oscillator to determine, during a lapse of time, a sampling value characterizing this digital oscillator. From a theoretical point of view, if no glitch occurs the sampling value will be always constant. In practice, some slight differences between sampling values may occur, despite the absence of glitches. This may be caused by jitter, e.g. variations in the period of the oscillator signal, and other variations within the circuit, e.g. temperature, voltage. However, if a single glitch or a series of glitches occur, the sampling value will be clearly different from that provided by the digital oscillator when no glitch occurs.

To this end, the method of the present solution proposes to perform the following steps as a repeatable round or cycle:

The first step of this round aims to assign a time window 5 to at least one digital oscillating signal 3. This time window 5 is implemented on the basis of a clock signal 4 as shown in FIG. 2. This means that the time window 5 is synchronous with the clock signal 4 and the duration of the time window is set on a certain number of oscillations of the clock signal. The clock signal 4 is substantially insensitive to the aforementioned at least one glitch 1 to detect in the electrical signal 2. This can be obtained through several embodiments, as already discussed above in the summary of the present solution.

The second step of this round aims to determine, from the time window 5, a sampling value 13 of the digital oscillating signal 3 to which this time window is assigned. This means that the sampling value 13 is determined from the digital oscillating signal 3 to which the aforementioned time window 5 is assigned and, more particularly, within the time limits $t_1$-$t_2$ defined by this time window. The sampling value 13 is a value that characterizes the digital oscillating signal 3 throughout its time window 5. Typically, such a value 13 may refer to the number of oscillations, pulses which may be positive and/or negative pulses, periods or edges which may be raising and/or falling edges of the digital oscillating signal 3 throughout its time window 5. Alternatively, the sampling value 13 may refer to value that derives from at least one of the examples of values listed above. For instance, the sampling value may refer to the frequency of the digital oscillating signal 3 during the time interval $t_1$-$t_2$ defined by its time window 5.

As shown in the example depicted in FIG. 3, the sampling value 13 corresponds to the number of pulses provided by the digital oscillating signal 3 during its time window 5, i.e. between $t_1$ and $t_2$. This number of pulses may be determined by a counter CTR configured to count each pulse of the digital oscillating signal 3 within the time window 5. Accordingly, the counter is reset, e.g. to zero, at the beginning of the time window: at instant $t_1$, and then counts each pulse of the digital oscillating signal 3 until the end of the time window: at instant $t_2$. As shown in the upper part of FIG. 3, the sampling value 13 is constant and is equal to 6 due to the fact that the digital oscillating signal 3 is also constant and especially not affected by glitches since no glitch is present in the monitored electrical signal 2.

The next step of the round aims to detect any potential glitch 1 in the electric signal 2 which can be regarded as a monitored electric signal. Such a step is performed by comparing the sampling value 13 with an expected reference value 23. This reference value 23 may be for example a nominal value provided by the digital oscillating signal 3 under normal conditions, without any glitches 1. For example, the reference value 23 may be the number of oscillations of the digital oscillating signal 3 within its time window 5 under normal conditions, especially when no glitch 1 occurs on the electric signal 2.

The last step of the round aims to output a response typifying a result of the comparison made in the former step. The result of the comparison may depend on the comparison itself, i.e. it may depend on the values compared and the comparison operation which is used, such as $>$, $<$, $=$, $\neq$, $\equiv$, $\cong$, $\geq$, $\leq$, $\ll$, $\gg$. For example, if the sampling value 13 is equal to the expected reference value 23, the response provided as output of this comparison may be a single bit "1", otherwise a bit "0" may be output. A lot of other comparisons should be applicable without necessarily providing a binary response, i.e. a response which is limited to two states. For example, the response may correspond to "11" if the difference between the sampling value 13 and the reference value 23 is greater than five, otherwise the response may correspond to "01" if this difference is greater than one, and finally if none of these cases is satisfied, then the response may correspond to "00".

Referring now to the lower part of FIG. 3, one can note that some glitches 1 occur in the monitored electrical signal 2. Given that the digital oscillating signal 3 is generated from the electrical signal 2 and is sensitive to common glitches i.e. glitches 1, this means that the digital oscillating signal 3 is sensitive to the same glitches as those occurring in the electrical signal 2. Due to the glitch sensitivity of the digital oscillating signal 3, one can see that the latter is affected by the glitches occurring on the electrical signal 2. Indeed, in the upper part of FIG. 3, the sampling value 13 is always equal to six, whereas in the lower part it is firstly equal to five, then to four. Some pulses of the digital oscillating signal 3 were lost because this signal 3 has been generated from the electrical signal 2 and the latter has been affected by glitches 1.

Consequently, if the reference value 23 was set to six, the comparison between the sampling value 13 and the reference value would indicate that no glitch has been detected in the electrical signal of the upper part of FIG. 3, whereas the same comparison would indicate the presence of at least one glitch in the case of the lower part of FIG. 3.

Time Window Variants and/or Digital Oscillating Signal Variants

Figure 4:
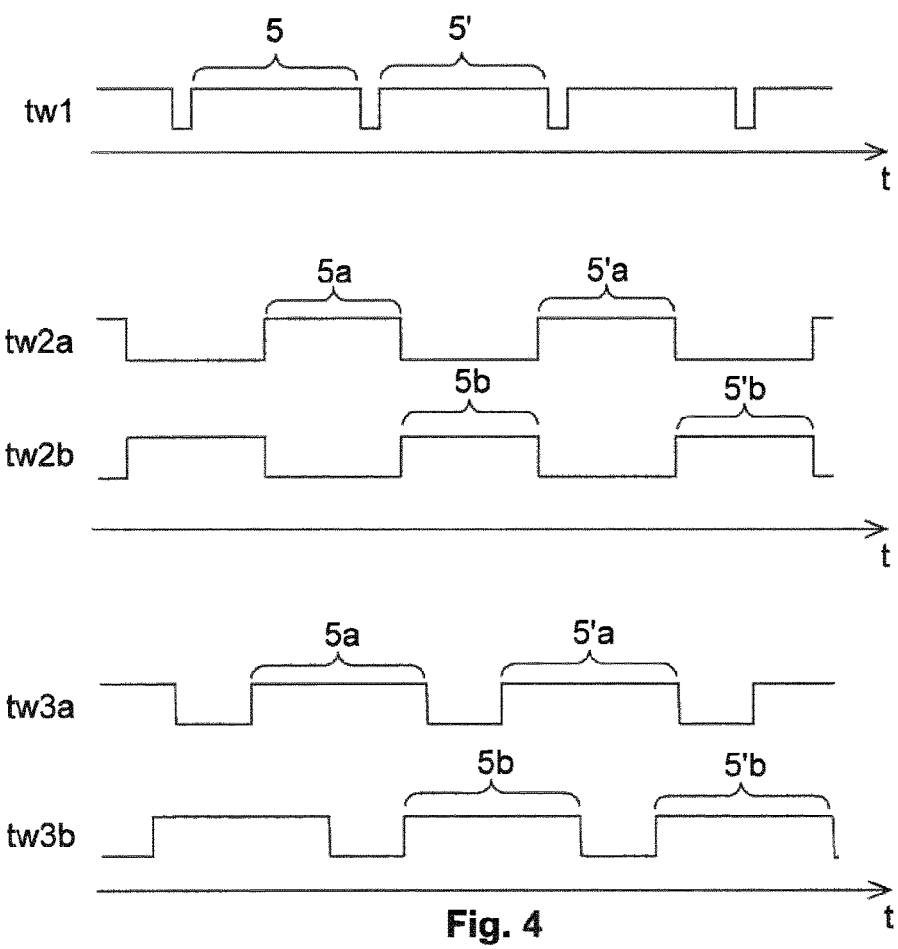
FIG. 4 schematically depicts the main differences related to some alternatives of the basic concept shown in FIG. 3.

FIG. 4 schematically illustrates alternate embodiments, especially regarding the time window 5. More specifically, this Figure shows three different embodiments which may be used as variants within the solution suggested in the present disclosure. Each embodiment is shown with a horizontal time axis t. The time windows 5, 5' successively assigned to the digital oscillating signal through the repeated steps of the round may be regarded as a so-called "time window signal" tw1.

According to the first embodiment, the time interval between two successive time windows 5, 5' is as small as possible. Preferably, this time interval will not excess the time required to:

compare the sampling value 13 with the expected reference value 23, so as to obtain a result, and assign a new time window 5' to the appropriate digital oscillating signal 3 in order to be ready to determine a new sampling value 13.

Once the result of the comparison is determined, the response typifying the result of the comparison may be output either within the aforementioned time interval, i.e. between two successive time windows, or subsequently, e.g. during the next time window 5'.

The second embodiment disclosed through FIG. 4 is depicted in the central part of this Figure through the so-called time window signals tw2a and tw2b. Instead of using successive time windows 5, 5' provided by a single time window signal tw1, the second embodiment suggests using two parallel time windows signals tw2a, tw2b which are desynchronized with respect to each other. More specifically, one can note in this second embodiment that the time interval between two successive time windows 5a, 5b, 5'a, 5'b, along the time axis t, is further minimized compared to that of the first embodiment of FIG. 4. In the case shown in the median part of FIG. 4, this time interval is reduced to zero because the windows 5a and 5b, or 5'a and 5'b, are out of phase, namely when the time window 5a or 5'a begins, the time window 5b, respectively 5'b, ends. Thus, the falling edge of the time window 5a, or 5'a, coincides with the rising edge of the time window 5b, respectively 5'b. Accordingly, two successive time windows, e.g. 5a, 5b, or 5'a, 5'b are temporally contiguous.

The third embodiment of FIG. 4 is shown at the bottom of this Figure through two parallel time windows signals tw3a, tw3b. Instead of the time windows 5a, 5b, 5'a, 5'b succeeding each other perfectly, by reducing the time interval between two successive time windows to zero, there is an overlap between these time windows. Accordingly, the time interval between two successive time windows may be regarded as being negative, in contrast with that of the single time window signal tw1 where it may be regarded as being positive. Such an overlap can be obtained using two identical time window signals tw3a, tw3b, as shown in the bottom of FIG. 4, or it may be obtained by using time windows 5a, 5b, or 5'a, 5'b, which are different. In any case, two successive time windows, e.g. 5a, 5b, or 5'a, 5'b temporally overlap, whatever the duration of the overlap.

Each of the time windows 5', 5'a, 5'b may be regarded as an additional time window assigned on the relevant digital oscillating signal 3. Thanks to the time window 5 and to the at least one additional time window 5', 5'a, 5'b, more than one sampling value 13 may be determined to monitor the electric signal 2. Preferably, one sampling value 13 may be determined from each time window 5, 5' or 5a, 5'a, 5b, 5'b. Still preferably, said at least one time window refers to time windows 5b, 5'b from each of which one sampling value 13 can be determined in addition to the sampling value 13 determined from the time window 5a, 5'a. In this way, several sampling values 13 can be advantageously determined in parallel relative to one another, as shown in the two last embodiments as shown in FIG. 4. In this way, the electric signal 4 may be advantageously monitored in continuous way, i.e. without time interruption.

The implementation of any embodiment based on two so-called "time window signals", may be obtained through two rounds of steps running in parallel. A first round may be in charge of the implementation of the set of the first time windows 5a, 5'a, whereas the set of the second time windows 5b, 5'b may be implemented by a second round running in parallel with the first round. The two rounds may be synchronized each other so as to obtain the second or the third embodiment of FIG. 4. Such synchronization may be obtained thanks to the clock signal 4 which can be used for any signals or any operation within a synchronous design or architecture.

A single digital oscillating signal 3 may be used for the two time windows 5a, 5b (5'a, 5'b) of the embodiments shown in FIG. 4. However, each time window 5a, 5b (5'a, 5'b) may be applied to its own digital oscillating signal 3. In this case, at least two digital oscillating signals 3 may be generated in parallel. These digital oscillating signals 3 may be identical or different each other. In other words, the frequency of a first digital oscillating signal onto which the first set of time windows 5a, 5'a is applied may be different from the frequency of a second digital oscillating signal onto which the second set of time windows 5b, 5'b is applied.

It should be noted that even if there is a single so-called "time window signal" tw1, as shown in the upper part of FIG. 4, the time windows 5, 5' may be applied onto more than one digital oscillating signal 3, either simultaneously or alternatively. For instance, some time windows, e.g. odd-numbered time windows if they were numbered, may be applied onto a first digital oscillating signal 3, whereas the other time windows, e.g. even-numbered time windows, may be applied onto a second digital oscillating signal 3. There is no requirement for the first and second digital oscillating signal to be identical. Alternatively, one can further consider having a single digital oscillating signal 3 whose frequency is modulated in accordance to the number of the time window 5, 5'. For example, the digital oscillating signal 3 may have a first frequency f1 for odd-numbered time windows 5, whereas the same digital oscillating signal 3, i.e. a signal 3 generated by the same generator, may have a second frequency f2 for even-numbered time windows 5'. Since the oscillating signal 3 is digital, therefore it may be obtained by a digital oscillation generator which can be set depending on the current time window 5, 5', so as to generate digital oscillating signal sometimes having a first frequency f1 and sometimes a second frequency f2.

Whatever the embodiment, it should be noted that the maximum number of digital oscillating signals 3 or frequencies of such a signal is no case limited to two.

Other Embodiments

According to a preferred embodiment, the clock signal 4 is a third party input signal or, in other words, a clock signal 4 which is provided, as input signal, by a third party device. Since the only signal which may be analog in the basic concept of the present solution is the clock signal 4, this additional embodiment provides a solution in which no analog signal is generated, or a solution where no analog data is generated.

Indeed, even if the clock signal 4 is an analog signal issued from an analog clock generator, this clock signal 4 is merely used as input data, or input signal, from a third party device or third party system which is external to the present solution. Accordingly, each step of the present solution may be performed by a digital component or several digital components.

Advantageously, the solution provided in accordance to this embodiment can be qualified as a full digital solution. It may provide significant advantages in terms of development, optimization, as miniaturization for example, and achievement. For example, such a full digital solution may be easily implemented under a software-based solution or a small form factor at a very low cost for many technical applications, e.g. in fields such as banking, telephony, computing, pay-TV and so on.

According to one embodiment, the clock signal may be generated from a power supply signal, such as analog power supply signal, which is dissociated from the electrical signal 2. This would mean that the signal used to power the oscillation generator from which the clock signal 4 is generated would be decoupled from the monitored electric signal 2. Advantageously, such an embodiment allows to ensure that the clock signal 4 will not be affected by any glitch occurring on the electrical signal 2. If the power supply is of high quality, then glitches are more likely to be feared from hacker attacks. By decoupling the clock signal 4 from the power supply signal, it becomes possible to isolate the clock signal 4 from any glitch attack. Consequently, if the clock signal 4 can no longer be affected by glitches, then this clock signal 4 may be generated by a digital oscillator, such as a ring oscillator, instead of being generated by an analog oscillator. This also means that in such a case, the basic concept of the present solution may also be regarded as a full digital solution.

According to one embodiment, the time window 5, 5', 5a, 5'a, 5b, 5'b has a duration which does not exceed one period of the clock signal 4. Accordingly, the response time provided by the round can be optimized. The duration of the time window defines the time interval during which at least one glitch can be detected. However, the higher is this duration, the longer will be the response time since the result of the comparison of the sampling value 13 with the expected reference value 23 cannot be determined before the end of the time window. Therefore, the duration of the time window may result from a compromise between the time range assigned to the glitch detection and the response time of each round.

Furthermore, the frequency of the digital oscillating signal 3 has also an impact on the sensibility of the glitch detection. Indeed, providing the digital oscillating signal 3 with a low frequency does not allow to have a glitch detection with a fine granularity. In contrast, if the digital oscillating signal 3 has a high frequency, the granularity of the response provided by the round will be much finer. On the other hand, a high frequency involves more computing resources and more energy consumption than a low frequency. The energy consumption may be regarded as a significant parameter, especially for autonomous small form factor solutions such as those embedded in smart cards for example.

In order to optimize the response time of the present solution, a first step may intend to reduce as much as possible the time interval between two successive rounds. To this end, the round may preferably be repeated as soon as it is ended or completed, in order to optimize the glitch detection.

According to one embodiment, such an optimization may also be obtained by adjusting the time window 5, 5', 5a, 5'a, 5b, 5'b, e.g. to specific requirements. To this end, the time window may be configured using at least one input parameter to set a specific duration. Setting the duration of the time window may be performed during an initial phase, for example before the round(s) is/are triggered. Each time window 5, 5', preferably each set of parallel time window 5a, 5'a and 5b, 5'b, may be configured using specific input parameters or values. Alternatively, a single parameter or set of parameters or values, may be applied to all time windows in order to set a specific duration to these time windows.

Similarly, the frequency of the digital oscillating signal 3 may also be set or configured using an input parameter or at least one additional input parameter. Advantageously, this embodiment allows to adjust the frequency or frequencies, e.g. f1, f2, of any digital oscillating signal 3, in similar way to that performed to adjust the duration of the time window.

According to a preferred embodiment, the sampling value 13 refers to a number of oscillations of the digital oscillating signal 3 throughout its related time window 5. The number of oscillations may be determined by a counting function. To this end, a counter can be reset at the beginning of the time window, and the counting can start at the rising edge of the time window and can be stopped at the falling edge of the same time window. For this purpose, a synchronization step may be added to trigger and stop the counting function respectively at the rising edge and at the falling edge of the time window. The number of oscillations of the digital oscillating signal 3 can be counted, throughout the time window, by several manners, for example by counting all rising edges or falling edges of the digital oscillating signal 3. In a variant, pulses of the digital oscillating signal 3 may also be determined and counted, e.g. by detecting each time this signal 3 reaches a predefined amplitude level.

Although the sampling value 13 may also refer to the frequency of the digital oscillating signal 3, it is more efficient to count, for example, all the rising edges of this signal 3, because a result is obtained more quickly than if the frequency has to be determined. Accordingly, the efficiency of the round is increased both in terms of speed and computing resources, while finally improving the efficiency of the glitch detection.

According to another embodiment, the digital oscillating signal 3 may be further filtered from any noise and/or jitter effect before determining the sampling value 13. To this end a filtering function may be applied at the output of the generator providing the digital oscillating signal 3, so as to obtain a filtered digital oscillating signal 3. Advantageously, such a filter or filtering function may be parameterized by input data, so as to adjust its filtering level e.g. at a predefined setting value. It should be noted that one can also disable the filtering function, e.g. by bypassing the filtering function or by setting the filtering level to one of its extreme levels. Such settings or adjustments may typically be performed during the initial phase mentioned above. Still advantageously, by working with a digital oscillating signal 3 that is already filtered, it is not necessary to add any filtering step in the round of the present solution. Therefore, the required time to execute the round is advantageously shortened while improving its response time.

Glitch Detection Locations

To further increase the efficiency of the glitch detection, strategic locations may be taken in account as additional particular embodiments to apply the steps of the present solution.

Glitches can be propagated inside a circuit through various paths which cannot be known in advance. However, some techniques developed in the laboratory have helped to identify specific locations that appear to be more strategic than others.

From an input voltage applied to the power supply terminals, e.g. GND, VDD, of a circuit, the voltage gradient through this circuit can be modeled in the form of a grid in which each mesh or node corresponds to a certain voltage. Therefore, such a grid may be regarded as a power supply grid which reproduces the power distribution plan within the circuit. Due to the resistance of the interconnections and components constituting the circuit, there is a voltage drop across the circuit commonly referred to as the IR-drop. The IR-drop can be modeled e.g. through software simulations. A static IR-drop analysis can be regarded as a representation of the power mesh quality performed in accordance with statistical or specific power consumption which typically depends on the number of gates, the frequency, the activity per circuit block and so on. A dynamic IR-drop analysis can be obtained using different functional scenarios.

Figure 5:
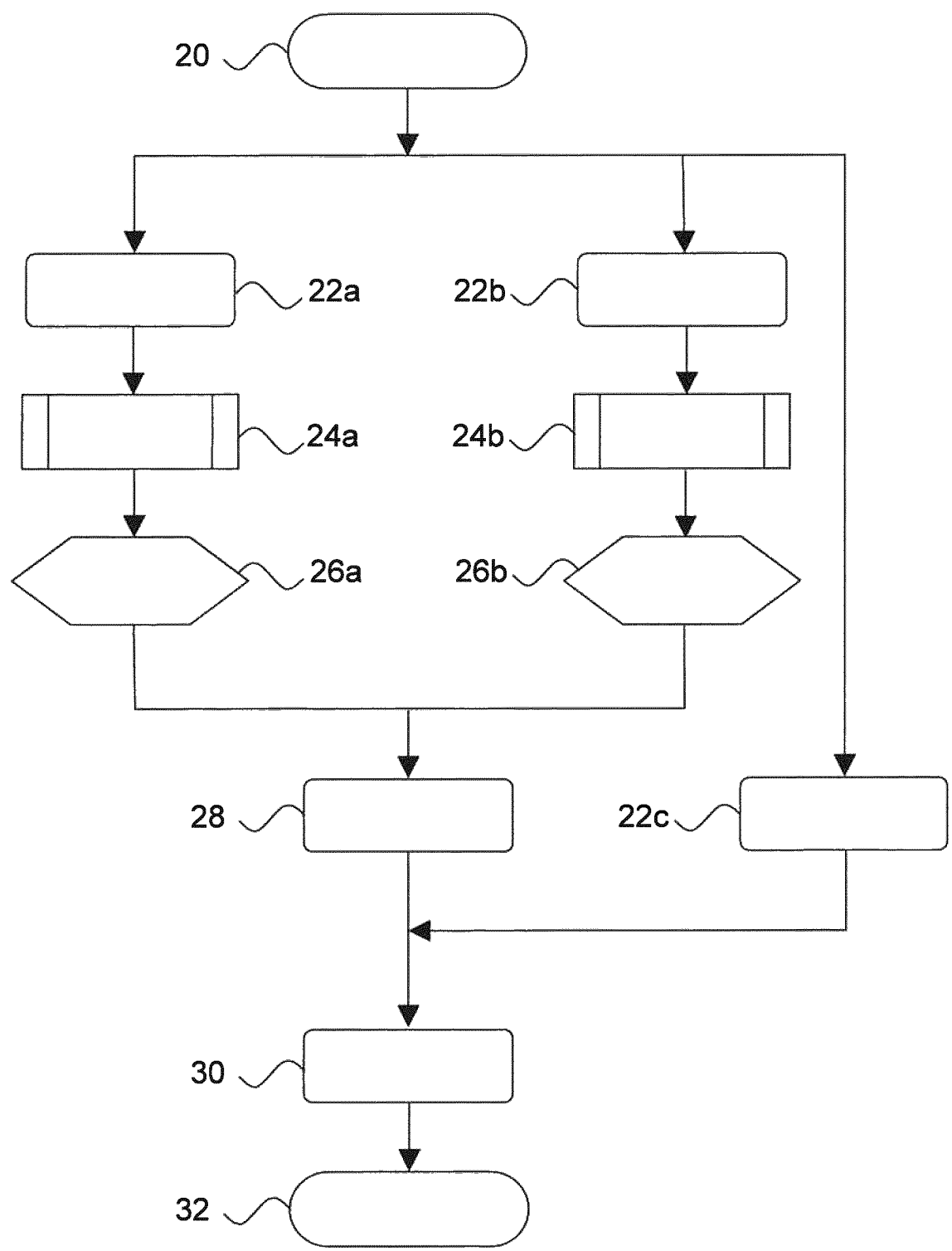
FIG. 5 is a flow chart of a process or an algorithm that may be used to deploy the present solution at a best location within a circuit.

FIG. 5 shows a flow chart of a process which may be used to determine the best locations, i.e. physical positions, where it should be suitable to perform glitch detections within a circuit. Indeed, the glitch detection according to the present solution is not limited to the detection of glitches on power supply, but it may be used for detecting glitches on any electrical signal 2 within a circuit.

Box 20 illustrates the beginning of the process which may be implemented, for example by using a computer-implemented algorithm.

Two main parallel paths appear just after the beginning. One of these path, in this case the left one, refers to steps performed in accordance with a static analysis, whereas the other path, i.e. the one on the right, refers to steps performed in accordance with a dynamic analysis.

At boxes 22a and 22b, respectively static and dynamic power constraints are applied to the circuit.

At boxes 24a and 24b, a static IR-drop analysis, respectively a dynamic IR-drop analysis is launched.

At box 26a, a weak static spot and a strong static spot are identified. In the same way, at box 26b, a weak dynamic spot and a strong dynamic spot are identified.

The two aforementioned paths meet at box 28 in order to check if there are common weak and strong spots. In other words, the operation undertaken at box 28 aims to look for common weak static-dynamic IR-drop and also aims to look for common strong static-dynamic IR-drop in order to increase the chance to get the most pertinent spot to observe.

At the next box 30, the present solution for detecting at least one glitch is applied at strategic locations identified at steps 26a, 26b. Preferably these strategic locations are refined, e.g. still at boxes 26a, 26b, so as to identify a spot where a potential difference with respect to one power supply terminal e.g. GND or VDD, of the circuit is high or low, still preferably the highest or the lowest. Still preferably, the strategic locations are those identified at box 28.

Whatever the embodiment, it should be understood that at least one of these strategic locations may be used to perform glitch detection.

Accordingly, the steps of the solution suggested through the basic concept or any of its embodiments are applied on the electrical signal 2 of a circuit, preferably at those strategic locations, for example physical positions, or at least one of those strategic locations. Providing glitch detection at strong IR-drop places, i.e. locations, and at weak IR-drop places, i.e. locations, allows to cover the most sensitive locations across the circuit or the chip.

Alternatively, the aforementioned electric signal can refer to that of a specific block or portion of the circuit, instead of referring to the entire circuit which may comprises several separate blocks or distinct portions. Accordingly, specific parts of a circuit such as sensitive blocks may be protected against glitches. Particular strategic locations may be reached, especially thanks to the miniaturization provided by the so-called "full digital" present solution. Indeed, the present solution gives access to new locations that remain impossible to reach using conventional solutions based one or more analog components.

Regarding the last box 32, it may be regarded as the end of the process or algorithm.

A third path, parallel to the aforementioned two main parallel paths, may also be taken from the beginning for checking locations of block to protect, as schematically shown through box 22c. Once this operation is achieved, the process through this third path may directly join the box 30. The third path schematically depicts some iterations that may be executed in order to obtain some refinements of the process.

The basic concept of the solution disclosed so far, or any of its embodiments, may be applied through a method suitable to detect at least one glitch in an electrical signal. Such a solution, including any of its embodiments, may also be applied by a device or a system. Accordingly, the next part of the present disclosure will especially refer to a device for implementing the aforementioned method, including any of its embodiments.

Device for Implementing the Method of the Present Solution

Figure 6:
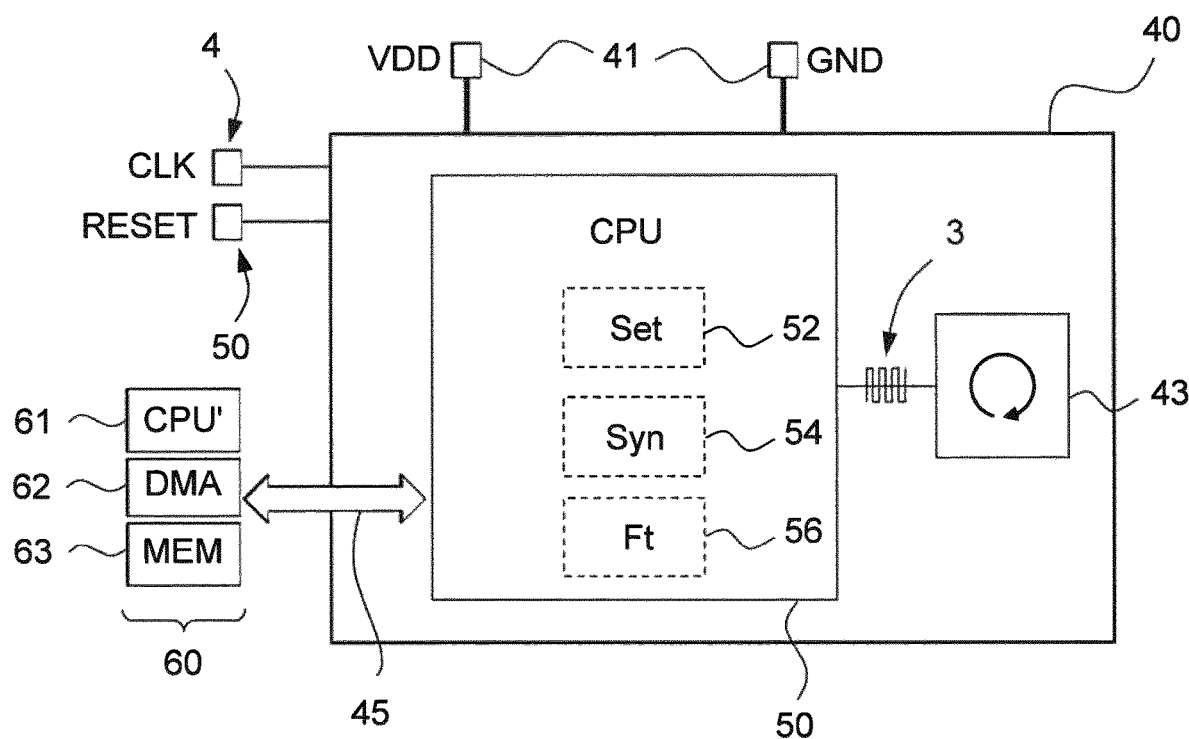
FIG. 6 provides an example of a main architecture of a device for implementing the method.

FIG. 6 provides an example of a main architecture of a device 40 for implementing the method based on any embodiments disclosed so far. As shown, the device 40 may comprises:

at least one digital oscillator 43 in order to generate the at least one digital oscillating signal 3;

a data interface 45 configured to output or exchange data beyond the device 40; and a computing unit 50 configured to perform at least the steps of the repeatable round or cycle disclosed above.

The device 40 is provided with power supply terminals 41, e.g. GND and VDD. Preferably, the clock signal 4 CLK is input into the device 40 as input signal. Such an input signal may be generated by a third party device or entity, typically by a clock generator which is external to the device 40 and which may generate the clock signal as a reference signal for an entire system whose the device 40 could be just one part of such a system.

Advantageously, by receiving a clock signal 4 from a third party entity external to the device 40, this device 40 can be regarded as a so-called "full digital" device. It may be made from a CMOS standard cells library and is fully synthesizable. Accordingly, the functions provided by the device 40 may be fully simulated, for example using a simulation program such as SPICE (Simulation Program with Integrated Circuit Emphasis). In other words, the operating steps of such a device 40 may be also recorded in the form of program steps, within a text file, to be executed by a microprocessor. Therefore, the present solution may be easily used through IP technology.

Still advantageously, it has no particular backend requirements and no extra hard macro development impact. The device 40 has very compact sizes and can take advantage of all the other benefits already mentioned above in connection with the former part of the present disclosure. Nevertheless, the clock signal 4 may be also generated by a dedicated clock generator located within the device 40, as already explained.

As shown in FIG. 6, the device may receive other signal as input signal, such as a reset signal 44. Such a reset signal 44 may be used to reset some data or parameter of the device 40, for example to totally or partially restore the factory configuration of the device 40. The reset signal 44 may be triggered for example by pressing a reset button from the external side of device or by receiving a remote command having the same effect.

Preferably, the digital oscillator 43 is a ring oscillator which may be made according to any one of the embodiments well known by the person skilled in the art. As a reminder, a ring oscillator is a device at least composed of odd number of inverter, i.e. NOT gates, in a ring, whose output therefore oscillates between two voltage levels. The inverters are attached in a chain and the output of the last inverter is fed back into the first inverter of the chain so as to create a loop or a ring. Delay cells or buffers may be added to increase the temporal offset of the signal between the two ends of the chain of inverters. A specific and preferred embodiment of a ring oscillator is shown in FIG. 6 and will be described in more detail later.

The data interface 45 of the device 40 is mainly configured to send or exchange any kind of useful data between the device 40 and its external environment. Preferably, the data interface 45 is connected to the computing unit 50 within the device 40. On the other side, i.e. at the external of the device 40, the data interface 45 may be connected to any kind of external units 60, for example to a micro-controller 61, a direct memory access 62 to store data or any other kind of memory 63.

Regarding the computing unit 50, this unit may be configured to perform any operation in connection with at least one of the digital oscillator 43, data transmitted through the data interface 45 and the signals 4, 44, 41 received as input signal in the device 40. Furthermore, the computing unit 50 may comprise a setting unit 52, a synchronizing unit 54, and a filtering unit 56. Instead of being located in the computing unit 50, any of these units 52, 54, 56 may be located outside the computing unit 50, while remaining inside the device 40. The same may be true for other units not shown in FIG. 6, such as a counting unit for counting the sampling value 13, a comparing unit for comparing the sampling value 13 with the expected reference value 23 or a memory unit for storing any kind of values or parameters such as the reference value 23. These units have not been shown in FIG. 6 because their functions may be performed by the computing unit 50 without requiring specific units. The same should be applicable with the functions provided by the units 52, 54 and 56 which, for this reason, have been each drawn using a broken line within the computing unit 50.

The setting unit 52 may be used to set some parameters or values used in any function, algorithm or steps within the device 40. Such a setting unit 52 may typically operable with the data interface 45 for receiving or exchanging data to be used for setting purposes. As already explained in connection with the first part of the present disclosure, data, values or parameters may be used e.g. to set any time window or duration, the frequency of the digital oscillating signal 3 to be output from the digital oscillator 43 or the filtering levels of a filtering function to be applied at the output of the digital oscillating signal 3, for instance.

The synchronizing unit 54 may be used for several purposes. For example, it can be used to implement the synchronization step designed to trigger and stop the counting function respectively at the rising edge and at the falling edge of the time window. The synchronizing unit 54 may also be used to synchronize the time windows with each other or to synchronize the rounds with each other if several rounds are running in parallel.

The filtering unit 56 may be especially used to filter the digital oscillating signal 3 from any noise or jitter. Accordingly, a clear digital oscillating signal 3 can be obtained and used by the computing unit 50 to identify any glitch, without any ambiguity.

Although a single digital oscillator 43 has been shown in the device 40 of FIG. 6, it should be noted that this device 40 may comprise more than one digital oscillator 43, depending on the number of digital oscillating signals 3 that are needed to implement any embodiment already discussed above.

The device 40 may be manufactured as a monolithic device, for example in a single chipset.

Figure 7:
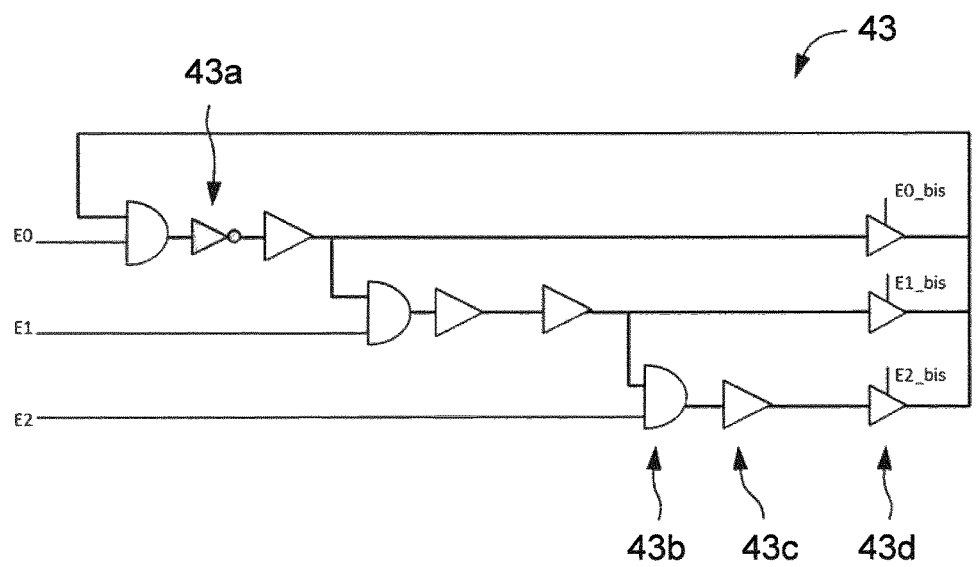
FIG. 7 shows the architecture of a preferred ring oscillator used in the present solution.

FIG. 7 shows the architecture of a ring oscillator used in the present solution as preferred digital ring oscillator 43. As shown in this FIG. 7, this ring oscillator is based on a three states ring selection, where the inputs E0, E1 and E2 are used to enable and to select the ring loop frequency of the ring oscillator 43 thanks to three possible loops. The input E0 is the input which activates the main ring loop.

This ring oscillator 43 always comprises an odd number of inverters 43a, as a NOT gates, in the ring path. In this case a single inverter 43a, such as single NOT gate, is used as example. This ring oscillator further comprises other logic gates 43b, as a AND gates. In addition, it comprises delay cells 43c which are especially used to increase the temporal offset of the signal between the inputs and the outputs of the loop of the ring oscillator 43. Finally, it comprises tri-states 43d.

Advantageously, the use of logic gates allows to reduce the power consumption. Indeed, in the present ring oscillator 43, the number of gates, in combination with an adequate clock gating, allows to cut the power consumption in the non-active part of the ring.

Thanks to such a ring oscillator 43, multiple frequencies may be selected so as to respond to different process variations and conditions of use of the circuit while remaining suitable to detect a whole range of glitches. Accordingly, the frequency may be selected so as to detect glitches whose detection may be affected by the specification dispersion of certain components of the circuit. By increasing the frequency of the digital oscillator, it becomes possible to improve the glitch detection so as to cover the entire range of such a dispersion.

The device 40 may be used in many technical fields. For example, it may be especially convenient for implementing the method of the present solution in the next smart cards generation. Thanks to the present solution, it becomes possible to detect any glitch occurring on the internal power supply of a device or system by using digital circuitry as logic circuits.

It should be noted that any other feature mentioned in connection with the method remains valid for the present device 40. However, for the sake of conciseness, the present disclosure refrains from repeating all variants and embodiment which may also be applied to the device 40.

FINAL CONSIDERATIONS

Although an overview of the inventive subject matter has been described with reference to specific example embodiments, various modifications and changes may be made to these embodiments without departing from the broader spirit and scope of embodiments of the present invention. For example, various embodiments or features thereof may be mixed and matched or made optional by a person of ordinary skill in the art. The Detailed Description, therefore, is not to be taken in a limiting sense, and the scope of various embodiments is defined only by the appended claims, along with the full range of equivalents to which such claims are entitled.

The invention claimed is:

1. A method for detecting at least one glitch in an electrical signal, said method comprising:
generating, from said electrical signal, at least one digital oscillating signal which is sensitive to glitches; and
performing the following as a repeatable round:
assigning a time window to at least one digital oscillating signal, said time window being implemented on the basis of a clock signal substantially insensitive to said at least one glitch to be detected;
determining from said time window a sampling value of the digital oscillating signal, said sampling value being characteristic of said digital oscillating signal throughout its time window;
detecting any potential glitch in said electrical signal by comparing said sampling value with an expected reference value; and
outputting a response typifying a result of the comparing, wherein
at least one additional time window is assigned on at least one digital oscillating signal, so that several sampling values are determined in parallel relative to one another.

2. The method of claim 1, wherein said clock signal is a third party input signal.

3. The method of claim 1, wherein said clock signal is generated from a power supply signal which is dissociated from said electrical signal.

4. The method of claim 1, wherein two successive time windows temporally overlap or are temporally contiguous.

5. The method of claim 4, wherein each of said successive time windows has a duration which does not exceed one period of the clock signal in order to optimize a response time provided by the round.

6. The method of claim 1, wherein said time window is configurable using at least one input parameter to set a specific duration.

7. The method of claim 1, wherein said at least one digital oscillating signal has a frequency configured using an additional input parameter.

8. The method of claim 1, wherein said sampling value is a number of oscillations of said digital oscillating signal throughout its related time window, said number of oscillations being determined by a counting function.

9. The method of claim 8, further comprising synchronizing by triggering and stopping the counting function respectively at a rising edge and at a falling edge of the time window.

10. The method of claim 1, wherein said method is performed on said electrical signal of a circuit at a location where a potential difference with respect to a power supply terminal of the circuit is high or low.

11. A method for detecting at least one glitch in an electrical signal, said method comprising:
generating, from said electrical signal, at least one digital oscillating signal which is sensitive to glitches; and
performing the following as a repeatable round:
assigning a time window to at least one digital oscillating signal, said time window being implemented on the basis of a clock signal substantially insensitive to said at least one glitch to be detected;
determining from said time window a sampling value of the digital oscillating signal, said sampling value being characteristic of said digital oscillating signal throughout its time window;
detecting any potential glitch in said electrical signal by comparing said sampling value with an expected reference value; and
outputting a response typifying a result of the comparing, wherein
said digital oscillating signal is further filtered from any noise and/or jitter effect before determining said sampling value.

12. A device for detecting at least one glitch in an electrical signal, the device comprising:
at least one digital oscillator configured to generate at least one digital oscillating signal which is sensitive to glitches;
a data interface configured to output or exchange data beyond said device; and
processing circuitry connected to the at least one digital oscillator and to the data interface, the processing circuitry being configured to perform the following as a repeatable round:
assigning a time window to at least one digital oscillating signal, said time window being implemented on the basis of a clock signal substantially insensitive to said at least one glitch to be detected;
determining from said time window a sampling value of the digital oscillating signal, said sampling value being characteristic of said digital oscillating signal throughout its time window;
detecting any potential glitch in said electrical signal by comparing said sampling value with an expected reference value; and
outputting a response typifying a result of the comparing, wherein
at least one additional time window is assigned on at least one digital oscillating signal, so that several sampling values are determined in parallel relative to one another.

13. The device of claim 12, wherein said clock signal is received from a third party entity external to said device.

14. The device of claim 12, wherein said at least one digital oscillator is based on a tri-state ring selection.

* * * * *